United States Patent [19]

Yanai

[11] 4,255,980
[45] Mar. 17, 1981

[54] VARIABLE RATIO STEERING GEAR

[75] Inventor: Tokiyoshi Yanai, Yokosuka, Japan

[73] Assignee: Nissan Motor Company, Limited, Yokohama, Japan

[21] Appl. No.: 922,353

[22] Filed: Jul. 6, 1978

[30] Foreign Application Priority Data

Aug. 16, 1977 [JP] Japan ................................ 52/97460

[51] Int. Cl.² ............................ B62D 3/02; B62D 3/08
[52] U.S. Cl. ................................. 74/388 PS; 74/425.5; 74/499
[58] Field of Search ................. 74/388 PS, 499, 425.5

[56] References Cited

U.S. PATENT DOCUMENTS

| | | | |
|---|---|---|---|
| 2,953,932 | 9/1960 | Lincoln | 74/388 PS |
| 3,693,470 | 9/1972 | Masuyama | 74/499 |
| 3,876,030 | 4/1975 | Kamamura et al. | 74/388 PS |
| 3,986,408 | 10/1976 | Takahashi et al. | 74/499 |
| 4,011,764 | 3/1977 | Buck | 74/499 |

FOREIGN PATENT DOCUMENTS

| | | |
|---|---|---|
| 1139040 | 5/1963 | Fed. Rep. of Germany . |
| 2240720 | 3/1973 | Fed. Rep. of Germany . |
| 2237421 | 2/1974 | Fed. Rep. of Germany . |

*Primary Examiner*—Louis Rimrodt
*Attorney, Agent, or Firm*—Schwartz, Jeffery, Schwaab, Mack, Blumenthal & Koch

[57] ABSTRACT

The tops of the teeth of a sector gear with respect to a plane of rotation of the sector gear are located on an addendum circle which is a single circular arc having a center which is located on a neutral line and which is spaced from the center of rotation of the sector gear in the direction of the arc. The portions of the top lands of the sector gear teeth at the larger diameter end of the sector gear are located on a common cylindrical surface, the remaining portions of the top lands being located on a common conical surface.

The rack formed on a ball nut for engagement with the sector gear teeth is provided with a central tooth groove and outside tooth grooves, wherein the outside tooth grooves are of depth less than the central tooth groove.

3 Claims, 9 Drawing Figures

VARIABLE RATIO STEERING GEAR

BACKGROUND OF THE INVENTION

This invention relates to a variable ratio steering gear of a recirculating ball type and particularly to improvements in a ball nut having a rack and a sector gear having tapered teeth meshable with the rack, which are incorporated in such steering gear.

As is well known in the art, a variable ratio steering gear is used on automotive vehicles of various types and is constructed to provide a high steering ratio at the neutral position of the steering wheel and a decreasing ratio as the wheel is displaced from the neutral position.

It has been proposed in the art to construct this kind of steering gear as shown in FIG. 1.

Referring to FIG. 1, a steering shaft 1 is provided with a helical groove 2 and is rotatably supported by a housing 3. The steering shaft 1 is connected to a steering wheel (not shown) and is rotatable together therewith. A ball nut 4 having an internal helical groove 5 is fitted over the helically grooved portion or the worm portion 2 of the steering shaft 1 and is disposed slidably within the housing 3. A plurality of balls 4 are disposed in a helical ball circuit (not designated) defined between the helical grooves 2 and 5 of the steering shaft 1 and the nut 4 so that the nut 4 may move axially of the steering shaft 1 upon rotation of the shaft 1. On the lower side of the nut 4 is formed a rack 6 having two outside teeth and two inside teeth located between the outside teeth. The teeth of the rack 4 are generated such that the top lands or tops 6b of the outside teeth are located higher, i.e. projected more outwardly of the nut 4, than the tops 6a of the inside teeth. A rockshaft 7 is rotatably supported by the housing 3 and is located transversely to the steering shaft 1 and the worm portion 2 thereof. The rockshaft 7 has integrally formed therewith a sector gear 8 the teeth of which mesh with the teeth of the rack 6. The teeth of the sector gear 8 are generated in a manner to have top lands or tops lying on an addendum curve 9 which is made up of a single arc having a constant radius $r_k$ and a center coinciding with the center O of rotation of the sector gear 8. The teeth of the rack 6 have various pressure angles. That is, the pressure angle of the inside tooth surfaces 6c of the inside rack teeth is designed sufficiently large for the convenience of avoiding interference between the teeth of the sector gear 8 and the rack 6. The pressure angle of the outside tooth surfaces 6d of the inside rack teeth is designed larger than that of the inside tooth surfaces 6c so as to prevent creation of undercuts in the roots of the teeth of the sector gear 8. The pressure angle of the inside tooth surfaces 6e of the outside rack teeth is designed considerably small so as to attain smooth and continuous engagement between the teeth of the sector gear 8 and the rack 6.

In this structure thus described, due to the fact that the radius of the pitch circle of the sector gear 8 is adapted to decrease in accordance with the increase in the displacement of the steering wheel from its neutral position and that the addendum curve 9 is a circular arc having a center located on the center O of rotation of the sector gear 8, the central tooth of the sector gear 8 has a tooth profile of the kind similar to the minus-shifted tooth profile in the theory of profile shifted gears, that is, the central sector gear tooth has tooth surfaces extending to intersect each other at a relatively sharp angle, whereas the outside teeth of the sector gear 8, which are located at each side of the central sector gear tooth, have tooth profiles of the kind similar to the plus-shifted tooth profile in the theory of profile shifted gears, that is, the outside sector gear teeth each has tooth surfaces extending to intersect each other at a blunter or less acute angle as compared with the central sector gear tooth. FIG. 2 shows the side elevation of the rockshaft 7 and the sector gear 8 incorporated in the variable ratio steering gear of FIG. 1. As shown in FIG. 2, the teeth of the sector gear 8 are tapered in the axial direction thereof, so the tooth profiles of the sector gear at the larger diameter end are tapered at the tops more acutely as compared with the corresponding tooth profiles at the smaller diameter end. Accordingly, the tops of the teeth of the sector gear 8, particularly the tops 8b and 8c of the outside teeth thereof are liable to be pointed or tapered considerably at the larger diameter end of the sector gear 8. The sector gear 8 having such pointed tops 8b and 8c is inferior in strength as well as engagement efficiency. In order to prevent creation of such pointed tops 8b and 8c, reduction of the radius of the addendum circle 9 may be considered useful so as to cut off the pointed top portions which are excluded by the reduced radius of the addendum circle. This, however, tends to cut off the tops 8a of the central tooth excessively, which inevitably involves an insufficient contact ratio in the engagement between the teeth of the sector gear 8 and the rack 6.

Furthermore, as the tops of the teeth of the sector gear 8 are located on a circular arc having a center located on the center of rotation of the sector gear 8, the teeth of the rack 6 are formed to have bottoms 6f and 6g lying on a common straight line extending parallel to the axis of the steering shaft as shown in FIG. 1. Accordingly, the minimum distances h from the internal helical groove 5 to the respective bottoms 6f and 6g are equal to each other. This involves a drawback in that the ball nut 4 has less strength at the localized portions thereof corresponding to the positions where the bottoms 6g are closest to the helical groove 5, because at the above localized portions a relatively large stress is induced in the nut 4 when the steering wheel is in a maximum steering angle condition. Thus, when the vehicle is driven to ride over a curb with the steering wheel on the maximum lock, a considerably large stress is induced in the localized portions of the nut 4 near the bottoms 6g and can cause a crack or cracks of the nut 4 near the bottoms 6g of the rack teeth. The nut 4 formed with such rack teeth is thus undesirable as a safety part of the vehicle.

The foregoing drawbacks existing in the prior art variable ratio steering gear of the kind thus described can be met by the structure disclosed in the U.S. Pat. No. 2,953,932 in which the outside teeth of the sector gear are formed smaller than the central tooth, i.e., the outside teeth are of smaller module as compared with the central tooth. However, the steering gear of U.S. Pat. No. 2,953,932 is expensive because its sector gear blank can not be produced or finished to the size through turning but requires complicated and therefore costly machining.

SUMMARY OF THE INVENTION

It is accordingly an object of the present invention to provide an improved variable ratio steering gear which is free from the foregoing drawbacks inherent in the prior art variable ratio steering gear of the described type and which is inexpensive.

It is another object of the present invention to provide an improved variable ratio steering gear in which sector gear teeth and rack teeth are optimally formed so as to provide a sector gear and a ball nut with increased strength.

It is a further object of the present invention to provide an improved variable ratio steering gear in which sector gear teeth are optimally formed so as to attain smooth and efficient mesh between the teeth of a sector gear and a rack.

BRIEF DESCRIPTION OF THE DRAWINGS

These and other objects and advantages of this invention will become more apparent from the following description in conjunction with the accompanying drawings in which:

FIG. 1 is a longitudinal sectional view of a prior art variable ratio steering gear of the kind with which the present invention is concerned with;

DESCRIPTION OF THE PREFERRED EMBODIMENT

Figure 1:
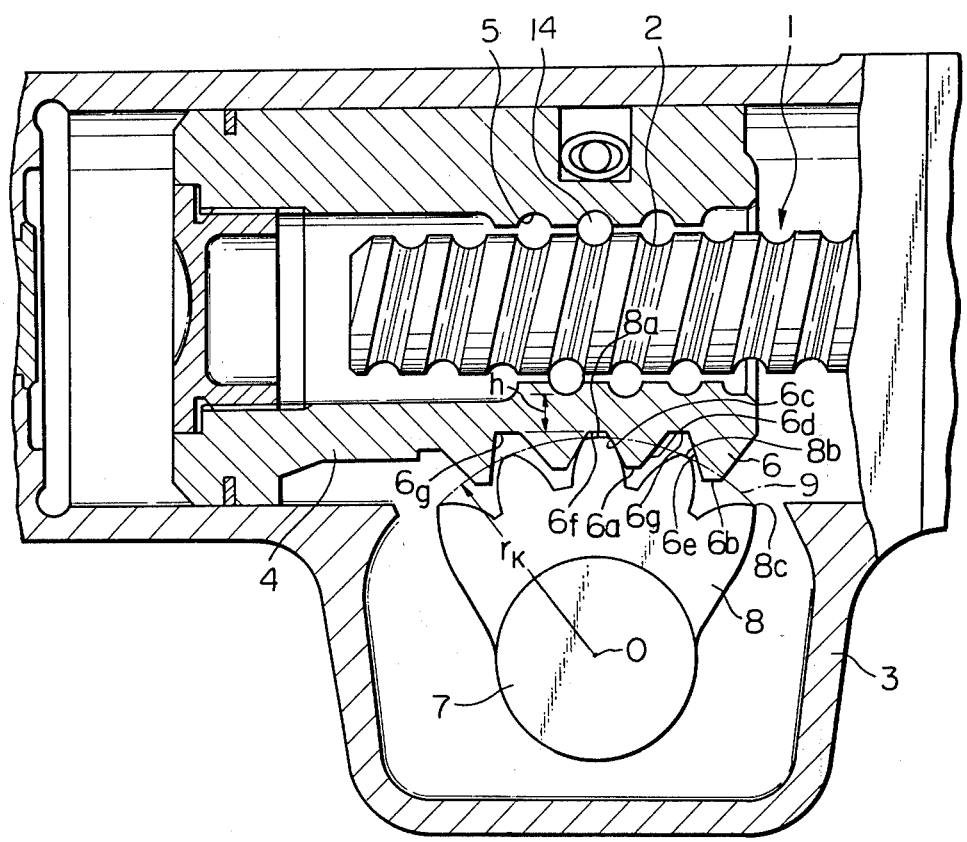
Figure 2:
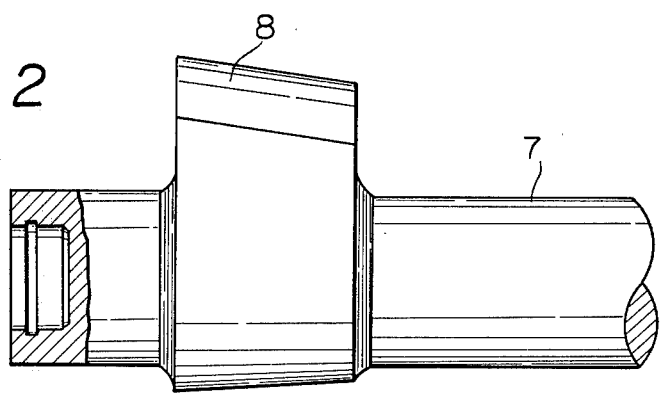
FIG. 2 is a side elevation view of a rockshaft and a sector gear incorporated in the variable ratio steering gear of FIG. 1.

Referring now to FIGS. 3 to 9 inclusive, a variable ratio steering gear of this invention will be explained. In FIGS. 3 to 9 inclusive, similar parts to the prior art steering gear of FIG. 1 are given same numerals and will not described again.

Figure 3:
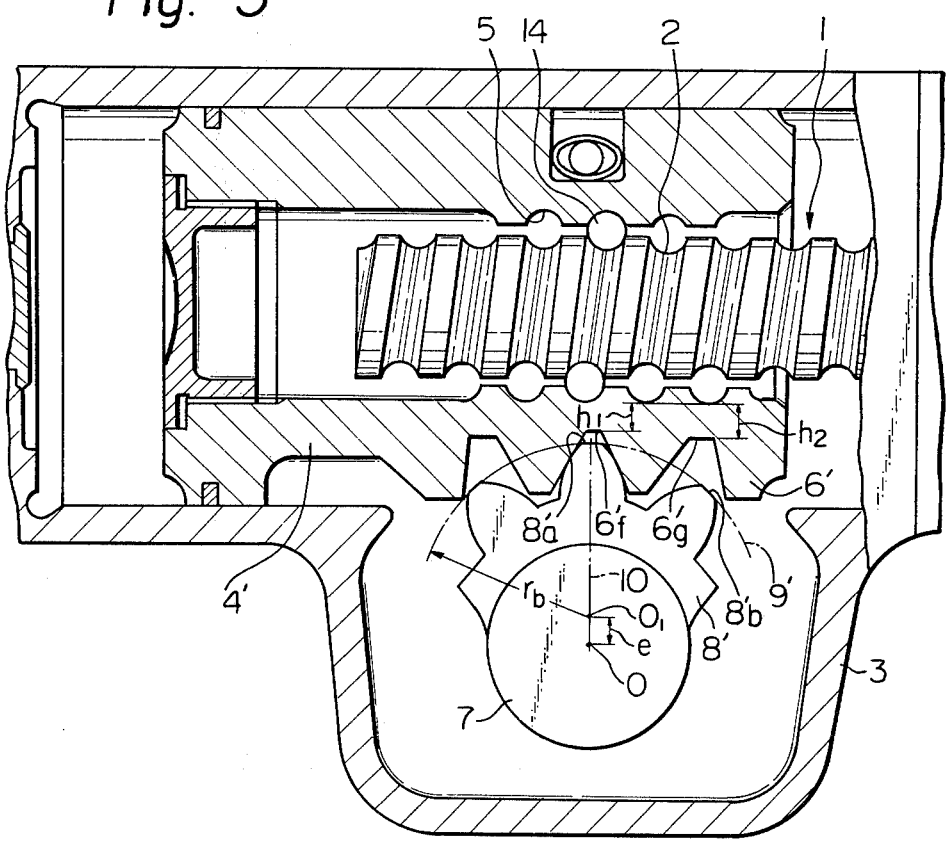
FIG. 3 is a longitudinal sectional view of a variable ratio steering gear according to the present invention.

A variable ratio steering gear according to the present invention comprises a sector gear 8' the teeth of which are generated in a manner to have top lands or tops 8'$a$ and 8'$b$ lying on an addendum curve 9' which is made up of a circular arc or a single arc having a constant radius $r_b$. The center $O_1$ of the arc 9' is located on a neutral line 10 and is spaced from the center O of rotation of the sector gear 8' by a distance e in the direction of the rack 6' or the arc 9'. In this instance, the tooth profiles of the sector gear 8' shown in FIG. 3 are a representation determined on a plane of rotation of the sector gear 8' along the line B—B of FIG. 4. The addendum curve 9' is thus determined on a plane of rotation of the sector gear 8'. The neutral line 10 is a line which is located on the plane of rotation of the sector gear 8' and which extends passing the center O of rotation of the sector gear 8' in such a manner that the tooth profiles of the sector gear 8' are symmetric with respect to the neutral line 10. When the sector gear 8' is in its neutral position as shown in FIG. 3, corresponding to the steering wheel in its neutral position, the neutral line 10 takes its position substantially perpendicular to the axis of the steering shaft 1.

The teeth of the sector gear 8' being formed as above, the tops 8'$b$ of the outside teeth are located closer to the center O as compared with the top 8'$a$ of the central tooth. Accordingly, it will be understood that according to the present invention the teeth of the sector gear 8' are optimally formed so as to prevent creation of the pointed tops of the teeth, especially the outside teeth at the larger diameter end, of the sector gear 8' without sacrificing the contact ratio in the engagement between the teeth of the sector gear 8' and the rack 6'.

Figure 4:
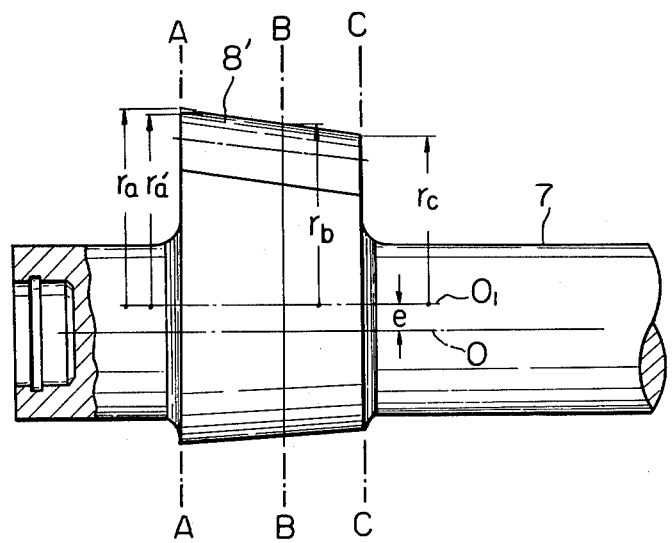
FIG. 4 is a side view, partly in section, of a rockshaft and a sector gear which are incorporated in the variable ratio steering gear of FIG. 3.
Figure 5:
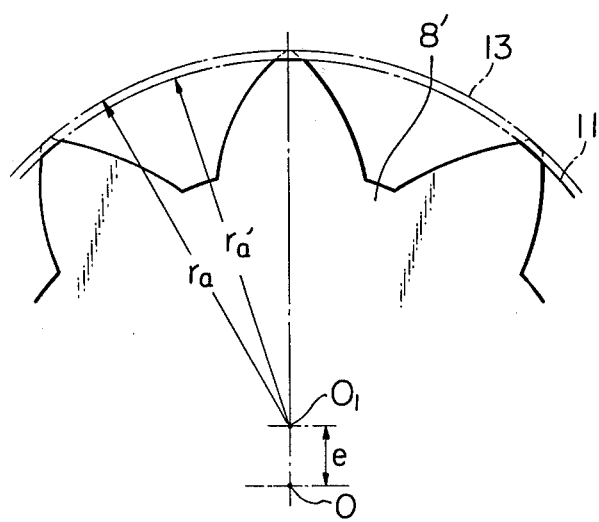
FIG. 5 is a fragmentary view showing the tooth profiles of the teeth of the sector gear taken generally along the line A—A of FIG. 4.
Figure 6:
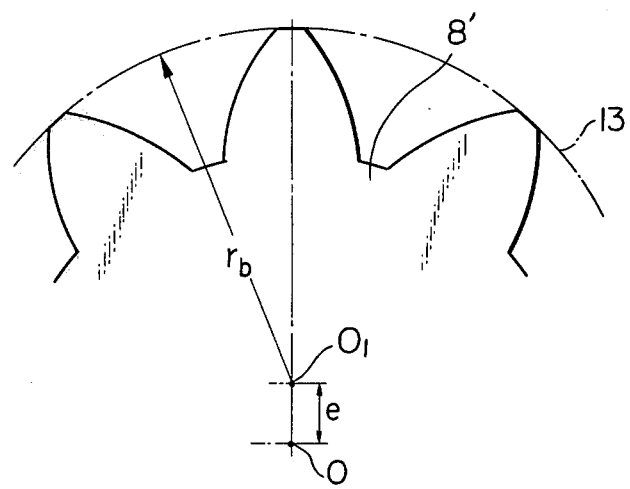
FIG. 6 is a fragmentary view showing the tooth profiles of the teeth of the sector gear taken generally along the line B—B of FIG. 4.
Figure 7:
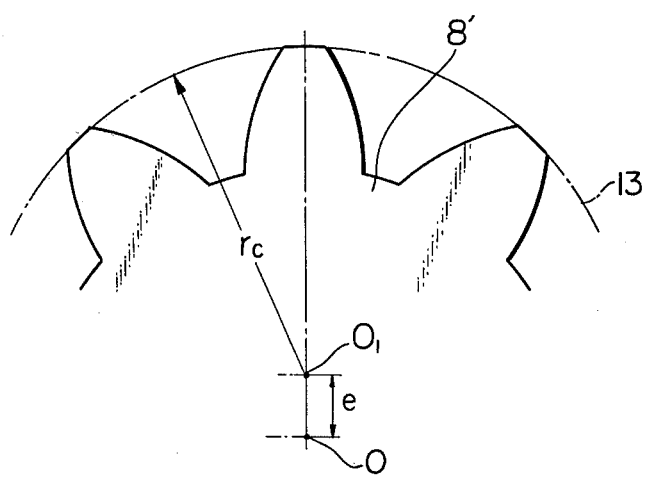
FIG. 7 is a fragmentary view showing the tooth profiles of the sector gear taken generally along the line C—C of FIG. 4.

The sector gear 8' formed with the teeth thus far described is further improved according to the present invention so as to increase the contact ratio in the engagement between the teeth of the sector gear 8' and the rack 6'. As best seen from FIGS. 4 and 5, the teeth of the sector gear 8' are shortened at their heights at the larger diameter end, at which end the radius of the arc 9' is largest, such that the portions of the tops or top lands 8'$a$ and 8'$b$ of the teeth of the sector gear 8' are located on a common cylindrical surface 11. The remaining portions of the top lands 8'$a$ and 8'$b$ are located on a common conical surface 13. The cylinder defining the cylindrical surface 11 and the cone defining the conical surface 13 are aligned to have a common axis $O_1$ which is parallelly offset from the axis O of rotation of the sector gear 8' by the distance e as shown in FIG. 4. FIGS. 5 to 7 show the wedge-like formation or taper of the teeth of the sector gear 8'.

The sector gear 8' having the teeth thus described is quite advantageous in increasing the contact ratio without sacrificing the strength. The tops 8'$a$ and 8'$b$ of the sector gear teeth are pointed at the larger diameter end as shown by phantom lines in FIG. 5 when the addendum circle radii $r_a$, $r_b$ and $r_c$ are increased in order to increase the contact ratio. However, those pointed top portions shown by the phantom lines in FIG. 5 can be cut off so as to locate the tops 8'$a$ and 8'$b$ at the larger diameter end on the cylindrical surface 11 which defines an addendum circle 9 having a center located on the center $O_1$ and a radius $r'_a$ smaller than the radius $r_a$. Therefore, the tooth profiles of the teeth of the sector gear 8' at the larger diameter end can be suitably thick at the tops 8'$a$ and 8'$b$.

Figure 8:
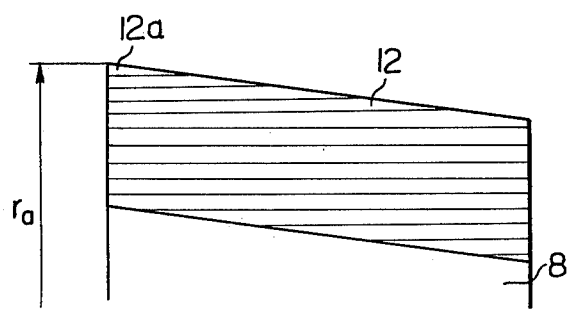
FIG. 8 is an enlarged side view of one tooth of a sector gear which is originally so shaped before improvement according to the present invention, showing the variation of the contact line with respect to the tooth surface of the sector gear.
Figure 9:
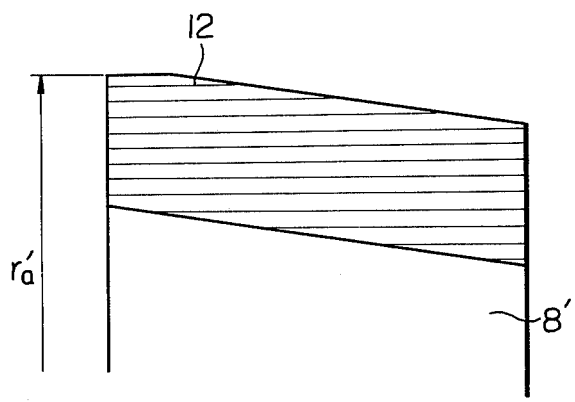
FIG. 9 is an enlarged side view of one tooth of the sector gear of FIG. 4 showing the variation of the contact line with respect to the tooth surface of the sector gear.

The sector gear 8' having the teeth thus described is further advantageous for the following reasons: The contact line between the teeth of the sector gear 8' and the rack 6' varies, as shown in FIGS. 8 and 9, in parallel to the axis of the rockshaft 7. Referring to FIG. 8 which shows the tooth surface of a sector gear tooth having a pointed top portion at the larger diameter end, a contact line 12 becomes considerably short at the pointed top portion. This causes a drawback in that a considerably large stress is induced at the top portion and can damage the sector gear tooth. As shown in FIG. 9, such pointed top portion is removed from the sector gear 8' according to the present invention. Therefore, the short contact line (indicated at 12$a$ in FIG. 8) does not occur in the engagement between the teeth of the sector gear 8' and the rack 6' incorporated in the variable ratio steering gear of this invention. The teeth of the sector gear 8' are thus assuredly prevented from being damaged.

Improvements are further made to a ball nut 4' according to the present invention. As described hereinbefore, the addendum curve 9' of the sector gear 8' is a circular arc having a center $O_1$ spaced from the center O of rotation of the sector gear 8' in the direction of the arc 9'. The tops 8'b of the outside teeth of the sector gear 8' are thus located closer to the center O than the top 8'a of the central tooth. This enables design of the rack 6' such that the outside tooth grooves of the rack 6' corresponding in mesh to the outside teeth of the sector gear 8' are of depth less than the central tooth groove of the rack 6'. In FIG. 3, the bottoms of the outside tooth grooves are indicated at 6'g and the bottom of the central tooth groove of the rack 6' is indicated at 6'f. As seen from FIG. 3 and according to the present invention, the teeth of the rack 6' are generated in such a manner that the outside tooth grooves are of depth less than the central tooth groove. That is, assuming $h_1$ as the minimum distance between the bottom 6'f and the helical groove 5 and $h_2$ as the minimum distance between the bottom 6'g and the helical groove 5, $h_2$ is made larger than $h_1$. This is attained without increasing the size of nut 4' whereby a sufficiently large strength can be achieved in the teeth of the rack 6' and therefore the nut 4', especially in the localized portions of the nut 4' adjacent to the outside teeth of the rack 6'. Therefore, even when the vehicle is driven to ride over a curb with the steering wheel on extreme lock and, as a result, an abnormally large load is applied to the steering gear, especially to the localized portions of the nut 4' adjacent to the outside rack teeth, the teeth of the rack 6' and the nut 4' are free from creation of a crack or cracks since the teeth of the rack 6', especially the outside teeth thereof, now have an increased strength sufficiently large to withstand the above large load.

In addition to the features of this invention thus far described, as the addendum curve 9' of the teeth of the sector gear 8' being a single circular arc, the blank for forming the sector gear 8' can be produced or finished to the size by turning which is simple and therefore inexpensive machining and by which the blank of a high quality can be produced at a high production rate.

What is claimed is:

1. A variable ratio steering gear comprising:
   a steering shaft having a worm portion;
   a ball nut axially movably mounted on said worm portion and having a rack formed on one side thereof;
   a rockshaft located transversely to said steering shaft and said worm portion; and
   a sector gear mounted on said rockshaft and having tapered teeth meshing with the teeth of said rack, the tops of said tapered teeth defining and lying on an addendum curve, the tooth profiles of said sector gear, determined on a plane of rotation of said sector gear, being symmetric with respect to a neutral line which is located on said plane and which extends past the center of rotation of said sector gear and perpendicularly to the axis of said steering shaft when the steering gear is in its neutral position, in which the addendum curve of said sector gear determined on said plane is a circular arc, the center of said arc being located on said neutral line and spaced from said center of rotation in the direction of said arc, whereby the tops of said tapered teeth can be formed by turning.

2. A variable ratio steering gear as claimed in claim 1, in which the teeth of said rack are generated in a manner providing a central tooth groove and outside tooth grooves on the respective sides of said central tooth groove, said outside tooth grooves being of depth less than said central tooth groove.

3. A variable ratio steering gear as claimed in claim 1, in which said sector gear has a larger diameter end at which the radius of said arc is largest, the teeth of said sector gear being shortened in their height at said larger diameter end such that the top lands of the teeth of said sector gear are located on a common cylindrical surface at said larger diameter end, the remaining portions of said top lands being located on a common conical surface.

* * * * *